(12) United States Patent
MacArthur et al.

(10) Patent No.: US 8,057,773 B2
(45) Date of Patent: Nov. 15, 2011

(54) REDUCTION OF GREENHOUSE GAS EMISSION FROM PETROLEUM REFINERIES

(75) Inventors: James B. MacArthur, Denville, NJ (US); James J. Colyar, Newtown, PA (US)

(73) Assignee: Institute Francais du Pétrole, Cedex (FR)

( * ) Notice: Subject to any disclaimer, the term of this patent is extended or adjusted under 35 U.S.C. 154(b) by 15 days.

(21) Appl. No.: 12/655,243

(22) Filed: Dec. 28, 2009

(65) Prior Publication Data

US 2011/0158900 A1    Jun. 30, 2011

(51) Int. Cl.
*C01B 31/20* (2006.01)
*C01B 3/24* (2006.01)
*C01B 3/26* (2006.01)

(52) U.S. Cl. .................. 423/437.2; 423/650; 423/652; 423/653; 423/654

(58) Field of Classification Search ............... 423/437.2, 423/652, 653, 654, 655, 656, 650
See application file for complete search history.

(56) References Cited

U.S. PATENT DOCUMENTS

| | | | | |
|---|---|---|---|---|
| 4,264,567 A | * | 4/1981 | Pinto | 423/359 |
| 4,914,218 A | * | 4/1990 | Kumar et al. | 95/100 |
| 4,963,339 A | * | 10/1990 | Krishnamurthy et al. | 423/437.2 |
| 5,520,894 A | * | 5/1996 | Heesink et al. | 423/230 |
| 6,048,508 A | * | 4/2000 | Dummersdorf et al. | 423/210 |
| 6,838,071 B1 | * | 1/2005 | Olsvik et al. | 423/437.2 |
| 6,881,394 B2 | * | 4/2005 | Keller | 423/652 |
| 7,354,562 B2 | * | 4/2008 | Ying et al. | 423/437.2 |
| 2009/0117024 A1 | | 5/2009 | Weedon et al. | |
| 2009/0230359 A1 | * | 9/2009 | Guvelioglu et al. | 252/373 |

* cited by examiner

*Primary Examiner* — Wayne Langel

(57) ABSTRACT

The invention described herein relates to a novel process that eliminates the need for post combustion $CO_2$ capture from fired heaters (at atmospheric pressure and in dilute phase) in a petroleum refinery to achieve environmental targets by capturing $CO_2$ in a centralized facility and providing fuel gas low in carbon to the fired heaters. It combines the pre-combustion capture of carbon dioxide with production of a hydrogen fuel source within a refinery to drastically reduce the carbon dioxide emissions of the plant. The hydrogen fuel is utilized for the process fired heaters and the fuel quality (carbon content) can be set to meet the refinery's emissions objectives. Moreover, the carbon dioxide captured can be sequestered and/or utilized for enhanced oil recovery (EOR).

12 Claims, 2 Drawing Sheets

US 8,057,773 B2

REDUCTION OF GREENHOUSE GAS EMISSION FROM PETROLEUM REFINERIES

FIELD OF THE INVENTION

Climate change concerns have increased awareness over the level of carbon dioxide ($CO_2$) emissions from various refinery processes. Applicants disclose an efficient and effective technique for reducing the carbon dioxide emissions from a petroleum refinery by capturing the carbon dioxide in a centralized facility and providing fuel gas low in carbon to process fired heaters, which accounts for a high percentage of carbon emissions at a typical refinery facility.

BACKGROUND OF THE INVENTION

Process fired heaters are collectively the major source of refinery carbon dioxide emissions. In a typical U.S. refinery, for example, approximately seventy percent (70%) of the carbon dioxide emitted to the atmosphere originates from process fired heaters.

These fired heaters combust natural gas, refinery fuel gas or liquid fuel oil with air and as a result emit a flue gas which is relatively dilute (15 V % or less) in $CO_2$ with nitrogen present as the primary gas. Although technology exists for capturing the dilute $CO_2$ from this stream, it is highly capital intensive and not practiced commercially. Another method involves feeding of purified oxygen from an air separation plant to the fired heaters which significantly increases the $CO_2$ concentration in the fired heater flue gas to the point where near pure $CO_2$ can be recovered after removal of sulfur species, particulates and water. However, this configuration also requires a recycle of $CO_2$ to the furnace to moderate the resulting temperature and also results in high investment and operating costs primarily related to the air separation plant and is not economically practical. Further, separate $CO_2$ capture facilities may be needed for each fired heater.

As a result of the need for an efficient and economical technique for reducing the $CO_2$ emissions in a refinery, applicant's herein disclose a novel process to eliminate the need for post combustion $CO_2$ capture from fired heaters (at atmospheric pressure and in dilute phase) in a petroleum refinery by capturing $CO_2$ in a centralized facility and providing fuel gas low in carbon to the process fired heaters.

SUMMARY OF THE INVENTION

The invention described herein relates to processes that combine the pre-combustion capture of carbon dioxide with production of a hydrogen-rich fuel source within a refinery to drastically reduce the carbon dioxide emissions from the plant. The hydrogen-rich fuel is utilized for the process fired heaters and the fuel quality (carbon content) can be set to meet the refinery's emissions objectives. Moreover, the carbon dioxide captured can be sequestered and/or utilized for enhanced oil recovery (EOR).

More particularly, the present invention describes a novel process configuration for reducing the carbon dioxide emissions of a petroleum refinery, petrochemical, or hydrogen plant by utilizing a low carbon hydrogen stream to fuel the process fired heaters and capturing the carbon dioxide stream pre-combustion comprising:

a) feeding a plurality of hydrocarbon feedstocks and steam to a steam reformer unit, said steam reformer reactor unit comprising a reactor section and a furnace section, to create a synthetic gas stream;

b) shifting said synthetic gas stream catalytically using a water gas shift unit to create a shifted synthetic gas stream;

c) capturing the carbon dioxide from said shifted synthetic gas stream through a carbon dioxide absorption process;

d) purifying the hydrogen remaining in said shifted synthetic gas stream after step c) to create a purified hydrogen fuel stream and a purge gas stream;

e) feeding said purified hydrogen fuel stream to process fired heaters, said furnace section of said steam reformer unit, and/or other process users within the refinery; and f) recycling said purge gas stream from step d) to said reactor section and/or said furnace section of said steam reformer unit, and wherein the carbon emissions of the refinery are reduced by more than 20 percent.

In a preferred embodiment, the carbon emissions of the refinery are reduced by more than 50 percent, more preferably by more than 80 percent.

In a preferred embodiment, the hydrogen stream from step d) is greater than ninety-nine percent pure.

In the future if refinery specifications become more stringent, in many cases carbon dioxide emissions will be reduced by 50% or even greater than 80%.

In another embodiment, the present invention describes a novel process configuration for reducing the carbon dioxide emissions of a petroleum refinery petrochemical or hydrogen plant by utilizing a low carbon hydrogen stream to fuel the process fired heaters and capturing the carbon dioxide stream pre-combustion comprising:

a) feeding a plurality of hydrocarbon feedstocks and steam to a steam reformer unit comprising a reactor section and a furnace section to create a synthetic gas stream;

b) shifting said synthetic gas stream catalytically using a water gas shift unit to create a shifted synthetic gas stream;

c) capturing the carbon dioxide from said shifted synthetic gas stream through a carbon dioxide absorption process;

d) purifying a portion of the hydrogen remaining in said shifted synthetic gas stream after step c) to a pressure swing adsorber to create a greater than ninety-nine percent (>99%) pure hydrogen fuel stream and a purge gas stream;

e) purifying the remaining portion of the hydrogen remaining in said shifted synthetic gas stream not purified in step d) using a hydrogen membrane to create a lower purity hydrogen fuel stream and a membrane purge gas;

f) feeding said greater than ninety-nine percent (>99%) pure hydrogen fuel stream from said pressure swing adsorber to process users within the refinery;

g) feeding said lower purity hydrogen fuel stream from said hydrogen membrane to said furnace section of said steam reformer unit and to the process fired heaters within the refinery;

h) recycling said purge gas stream from step d) to said reactor section and/or said furnace section of said steam reformer unit:

i) recycling said membrane purge gas from step e) to said reactor section of said reformer unit, and wherein the carbon emissions of the refinery are reduced by more than 20 percent.

In a preferred embodiment, the carbon emissions of the refinery are reduced by more than 50 percent, more preferably by more than 80 percent.

DETAILED DESCRIPTION OF THE INVENTION

Figure 1:
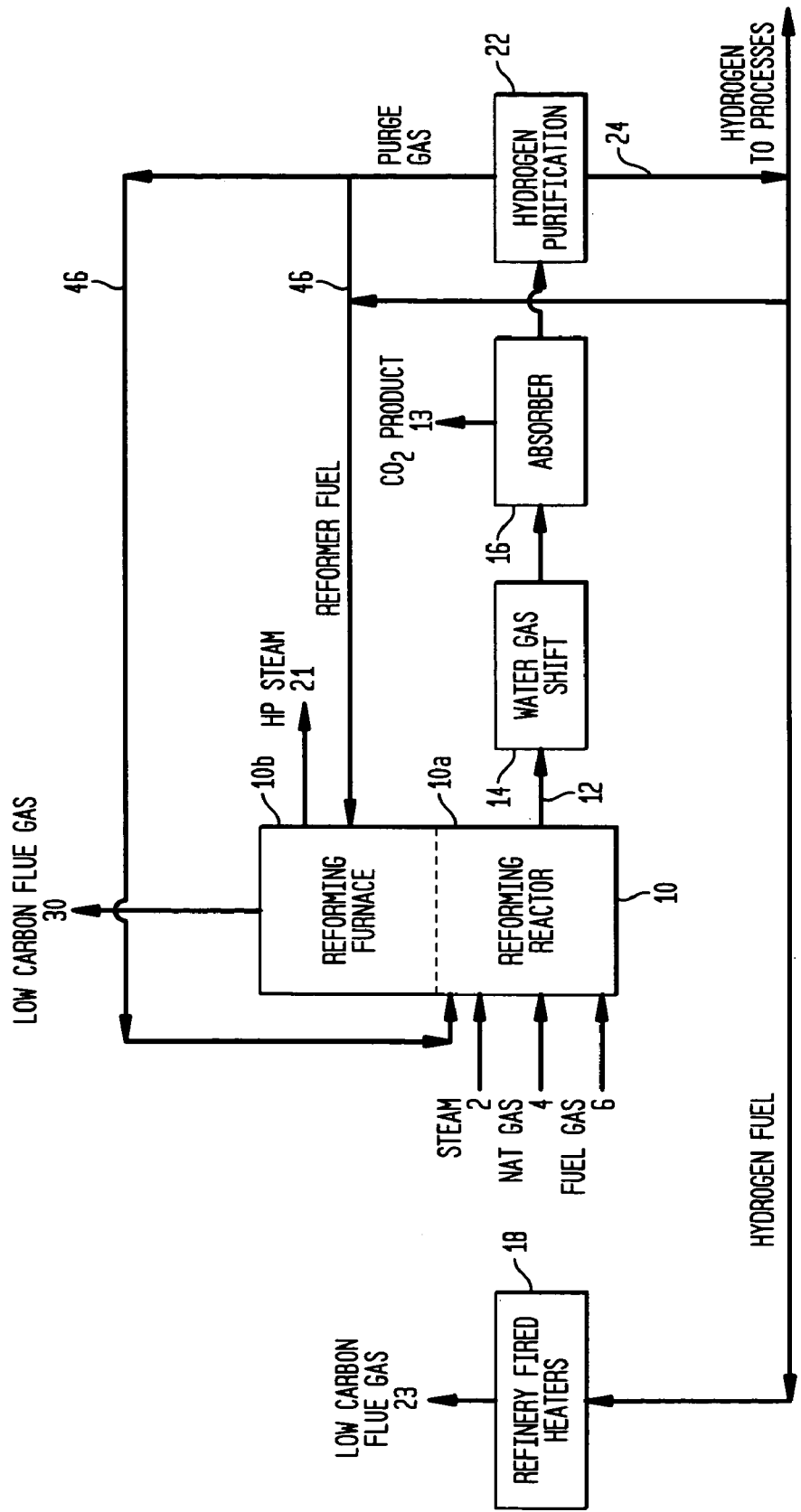
FIGS. 1 and 2 are schematic flow sheets of Applicant's process for reducing carbon dioxide emissions from petroleum refineries.

In FIG. 1, a steam reformer reactor unit 10 comprising a reactor section 10a and a furnace section 10b is fed by steam 2 and three fuels including natural gas 4, refinery fuel gas 6, and recycled off or purge gas 46 from the hydrogen purification unit 22, typically comprising a Pressure Swing Absorption (PSA) unit. Natural gas is a gaseous fossil fuel consisting primarily of methane.

Steam reforming is sometimes referred to as steam methane reforming (SMR) and is an efficient and effective method of producing commercial bulk hydrogen. The steam reformer reactor unit 10 operates at high temperatures (700-1100° C.) and in the presence of a metal-based catalyst. In the steam reformer reactor unit 10, the primary reaction is the steam 2 reacting with the methane in the natural gas 4 and fuel gas 6 to yield carbon monoxide and hydrogen according to the following formula:

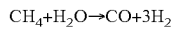

$$CH_4 + H_2O \rightarrow CO + 3H_2$$

Other reactions occurring in the steam reformer reactor unit 10 include the water gas shift according to the formula:

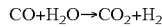

$$CO + H_2O \rightarrow CO_2 + H_2$$

The primary SMR reaction is strongly endothermic and requires high temperatures to obtain high methane conversion rates. The large energy requirement for the SMR process is obtained from oxidation/combustion reactions occurring in the furnace section 10b of the steam reformer reactor unit 10 operation. The product from the steam reformer reactor unit 10 is a synthetic gas ("syngas") 12 containing CO, $CO_2$, $H_2$, $H_2O$ and unrearcted $CH_4$.

The syngas 12 is then catalytically shifted (CO+$H_2O \rightarrow CO_2+H_2$) in a water gas shift unit 14 to increase the hydrogen content. The water gas shift reaction is usually carried out in two stages: a high temperature stage, with typical reaction temperatures of about 350-400° C., and a low temperature stage, with typical reaction temperatures of about 180-240° C.

While the lower temperature reactions favor more complete carbon monoxide conversion, the higher temperature reactions allow recovery of the heat of reaction at a sufficient temperature level to generate high pressure steam. For maximum efficiency and economy of operation, it may be advantageous to have a high temperature reaction unit for bulk carbon monoxide conversion and heat recovery, and a low temperature reaction unit for final carbon monoxide conversion.

The resulting gas is sent to an absorber 16, preferably an amine absorber, to remove the carbon dioxide 13. The absorber 16 is typically an absorber that utilizes such solvents as monoethanolamine (MEA) and potassium carbonate ($K_2CO_3$). The captured carbon dioxide 13 is thereafter compressed and exported where it can be used for enhanced oil recovery operations and/or sequestered.

The $CO_2$ lean syngas product is thereafter sent to a hydrogen purification unit 22 which is typically a Pressure-Swing Adsorption ("PSA") unit to produce high purity hydrogen. The PSA process is based on the principle that adsorbents are capable of adsorbing more impurities at a higher gas-phase partial pressure than at a lower partial pressure. The impurities are adsorbed in a fixed-bed adsorber at high pressure and then rejected as the system pressure "swings" to a lower level. Hydrogen is essentially not adsorbed. The ability to completely adsorb impurities allows the production of a hydrogen product with very high purity.

The purge gas 46 from the hydrogen purification unit 22 contains a combustible mixture of hydrogen, carbon monoxide, carbon dioxide, and methane and is routed to the SMR reactor unit 10 with the largest fraction (>80%) sent to the reactor section 10a and the smaller fraction routed to the furnace section 10b to reduce impurities such as nitrogen and argon from the hydrogen product. The SMR furnace 10b provides the heat for the endothermic reforming reaction and also produces a significant quantity of high quality steam 21. The furnace 10b is fed by the product hydrogen 24 from the hydrogen purification unit 22 and the smaller portion of the PSA purge gas 46. The low carbon content of the combined fuel to the SMR furnace 10b will result in significant reduction in the amount of $CO_2$ in the resultant flue gas 30 emitted to the atmosphere from the SMR furnace 10b.

The hydrogen product 24 from the hydrogen purification unit 22 is routed to multiple users, including the SMR furnace 10b, the refinery process users (hydrotreaters, etc.), and to displace all or a portion of the fuel to the refinery fired heaters 18. The low carbon content fuel to the refinery fired heaters 18 and to the SMR furnace 10b will result in significant reduction in the amount of $CO_2$ in the resultant flue gas 23 emitted to the atmosphere in the refinery process heaters 18 as well as the production of a high purity $CO_2$ product which can be sequestered or utilized for EOR.

Figure 2:
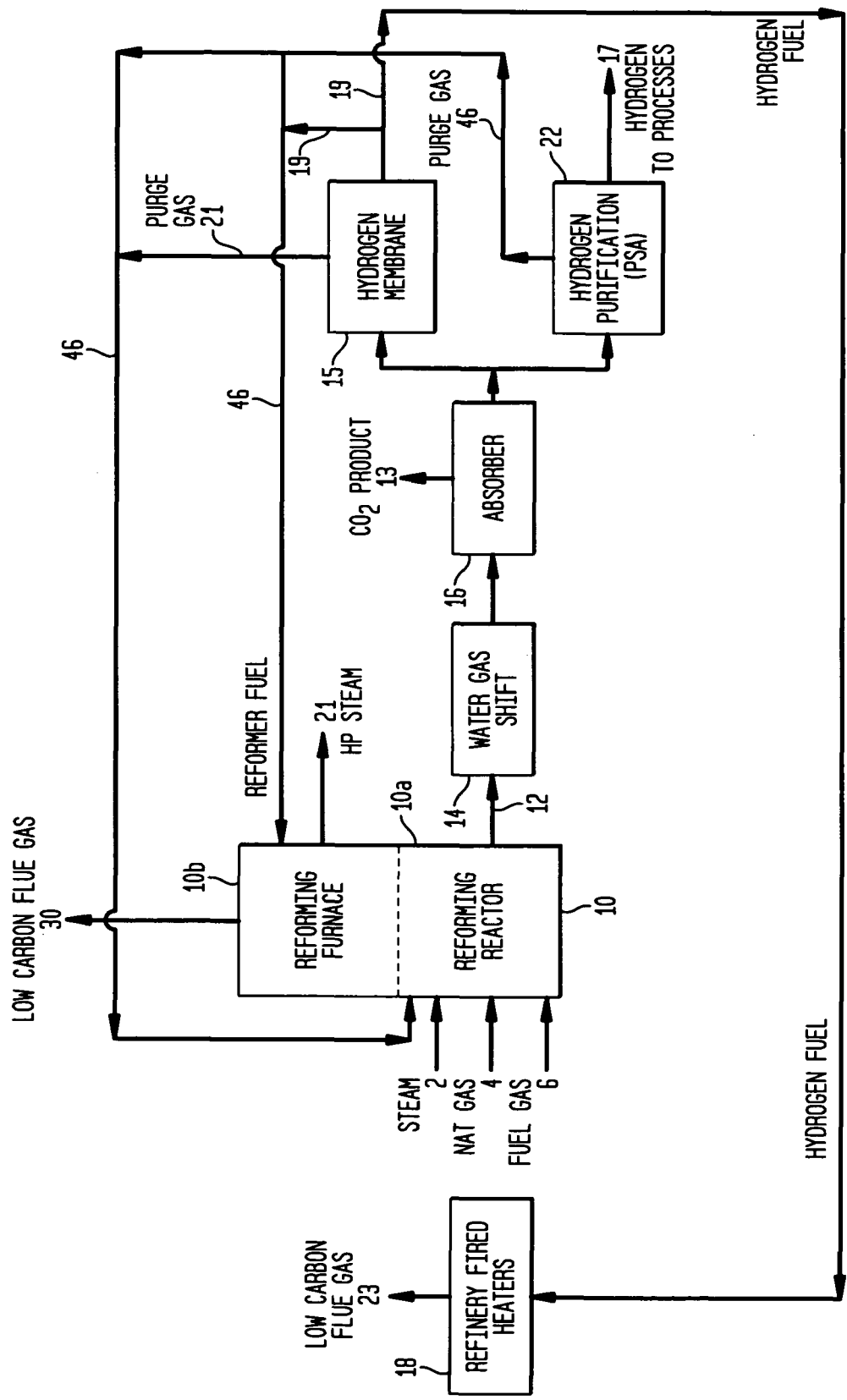

As shown in FIG. 2, it would be possible and in some cases preferred to take the product syngas from the $CO_2$ absorber 16 and split it between a hydrogen membrane 15 and the aforementioned PSA hydrogen purification system 22. Since the hydrogen stream 17 from the PSA 22 will be of higher purity it would thereafter be preferably utilized for process users (hydrotreating, etc.). The hydrogen stream 19 from the lower cost hydrogen membrane unit 15 will be of lower purity and lower pressure and could be utilized for the SMR furnace 10b fuel and the displacement of refinery fired process heater 23 fuel. The membrane purge gas 21 is available at elevated pressure and can be recycled to the SMR reactor section 10a. This second processing configuration is shown in FIG. 2.

In a preferred embodiment, a majority of said purge gas from step d) is fed to said reactor section of said steam reformer reactor and a smaller quantity of said purge gas from step d) is fed to said furnace section of said steam reformer reactor.

The membrane systems are based on the difference in permeation rates between hydrogen and impurities across a gas-permeable polymer membrane. Permeation involves two sequential mechanisms: the gas-phase component must first dissolve into the membrane and then diffuse through it to the permeate side. Different components have different solubility and permeation rates. Solubility depends primarily on the chemical composition of the membrane and diffusion on the structure of the membrane. Gases can have high permeation rates as a result of high solubility, high diffusivity, or both. The driving force for both solution and diffusion is the partial pressure difference across the membrane between the feed and permeate sides. Gases with higher permeability, such as hydrogen, enrich on the permeate side of the membrane, and gases with lower permeability enrich on the non-permeate side of the membrane because of the depletion of components with high permeability. The first fraction of the gas to permeate through the membrane consists primarily of the components with the highest permeability. As a larger fraction of the feed gas is allowed to permeate, the relative amount of the components with lower permeability increases in the permeate stream. In hydrogen separations, higher purity hydrogen is associated with lower recovery, and lower purity hydrogen is associated with higher recovery.

This invention will be further described by the following example cases, which should not be construed as limiting the scope of the invention.

EXAMPLE

The following example cases are based upon a typical North American refinery which is currently operated without $CO_2$ capture. The refinery processes 100,000 BPSD of crude with gasoline and diesel being the primary products and other environmentally acceptable liquids also produced. The refinery includes crude atmospheric and vacuum distillation, an FCC Unit, catalytic reforming unit, hydrotreater units, and a natural gas fed SMR Unit.

The base case with no $CO_2$ capture is outlined in Table 1 and also includes estimated $CO_2$ emissions as reported in the literature. The total $CO_2$ emissions are 115 Lb/Bbl of refinery feed and result in 5,750 STPD of $CO_2$ being emitted to the atmosphere. The SMR unit is fed with natural gas and provides 30.5 mM SCFD of hydrogen. The $CO_2$ emissions are segregated into three sources: from the SMR Unit (862 STPD), from the FCC Unit (1,000 STPD) and from the plant fired heaters (3,888 STPD). It is assumed that the $CO_2$ emissions from the FCC regenerator (1,000 STPD) are not modified in the cases utilizing the applicant's process. Additionally, as shown at the bottom of Table 1, it is assumed that the fired heaters are fed an 80%/20% blend by energy content of refinery generated fuel gas and imported natural gas and that the total energy provided to the heaters is 2,249 mM Btu/Hr.

Five cases, including the base case described above, are shown to illustrate the advantages of Applicant's invention. Tables 2 and 3 show the results of these cases with a summary of the refinery $CO_2$ material balance shown in Table 3. The base case is as described above for a typical U.S. 100,000 BPD petroleum refinery without $CO_2$ capture. The base case results are shown in the first column and details the estimated values of natural gas, refinery fuel gas, hydrogen, and the make-up of the fuels to the process fired heaters.

In the second case, shown in the second numerical column, $CO_2$ capture is added to the 30.5 mM SCFD SMR $H_2$ plant reaction side to calculate the impact of $CO_2$ capture on the refinery $CO_2$ emissions. $CO_2$ capture can be achieved using amine absorption to remove the majority of the $CO_2$ from the SMR PSA feed gas. As shown in Table 3, this second case reduces the total $CO_2$ emitted to the atmosphere by the refinery by just 8%, far below proposed environmental targets.

In the first case that utilizes Applicant's invention, which is shown in the third column, the processing configuration as shown in FIG. 1 is utilized so that all of the fired heater duty is replaced by using of high purity $H_2$ product gas feed (with added SMR capacity). The feed to the SMR is all of the available refinery fuel gas (74.9 mM SCFD) plus 54.7 mM SCFD of natural gas. $CO_2$ capture is included. The SMR furnace is fed product $H_2$ plus a small portion of the PSA purge gas. $CO_2$ emissions from the SMR furnace are relatively small. The SMR unit provides the 30.5 mM SCFD hydrogen required for the refinery process users, 162 mM SCFD for the SMR furnace, and 186 mM SCFD for the refinery fired heaters. As shown in Table 2, the 2,249 mM Btu/hr of required fired heater duty is provided by the SMR $H_2$ (1,990 mM Btu/Hr) and the high temperature steam from the SMR (259 mM Btu/Hr). In this example, some fired heaters are replaced with high temperature steam exchangers for process heating. In this comparison, it is estimated that the SMR would still provide a net HP steam product of approximately 85,400 Lb/Hr which is equal to that for the base case. A large quantity of $CO_2$ is captured in the SMR Unit absorber. As shown in Table 3, this configuration reduces the refinery $CO_2$ emissions of the base case by 79.2 percent. The $CO_2$ emissions are primarily from the FCC unit which, as mentioned above, are not affected by this invention.

The second case utilizing the Applicant's invention is shown in the fourth column in Tables 2 and 3 and is a case where the product gas from the $CO_2$ absorber is split between a hydrogen membrane and the PSA hydrogen purification system. The membrane $H_2$ product is less pure and is utilized for the SMR furnace and fired heater fuel. The high purity PSA hydrogen is only utilized for the process users (30.5 mM SCFD of $H_2$ as in the base case). The membrane purge gas is available at high pressure compared to the PSA unit purge gas and can be recycled to the SMR reaction section with lower energy and cost requirements. The hydrogen flow rates shown in Table 2 are a combination of that purified in the membrane and in the PSA units. The results for this case are similar to the first invention case with 80.6 percent reduction in the amount of $CO_2$ emitted to the atmosphere. The choice between the first two invention cases will be based on the relative economics of membrane versus PSA $H_2$ purification, cost of $CO_2$ emissions, and the cost of high carbon purge gas recycle to the SMR reactor.

The third case utilizing the Applicant's invention utilizes the same configuration as in the prior case with the product gas from the $CO_2$ absorber split between a hydrogen membrane and the PSA hydrogen purification system. However, this last case shows the situation where complete $CO_2$ emission reduction is not required. The case nevertheless achieves a 20% reduction as compared with the base case $CO_2$ emissions by displacing only a portion of the refinery fired heater fuel with $H_2$ and HP steam. Of the 2,249 mM Btu/Hr fired heater duty, 150 mM Btu/Hr is via membrane $H_2$ product, 37 mM Btu/Hr, and the remaining 2,062 mM Btu/Hr is the original fuel gas/natural gas fuel. The SMR Unit feedstock is 100% natural gas (23.1 mM SCFD) and produces 92 mM SCFD of $H_2$. This hydrogen is a combination of that purified in the membrane and PSA units. The $H_2$ is utilized for process users (30.5 mM SCFD), the SMR furnace (47.4 mM SCFD) and for the fired heaters (14.1 mM SCFD). A shown in Table 3, 1,333 STPD of $CO_2$ is captured in the SMR Unit absorbers and the net $CO_2$ emission to the atmosphere is 4,603 STPD, a 20% reduction relative to the base case.

TABLE 1

Refinery Bases

| | Units | Example Base Case |
|---|---|---|
| Crude Feedrate | BPSD | 100,000 |
| Total $CO_2$ Emissions without Capture | Lb/Bbl | 115 |
| $CO_2$ Produced | STPD | 5,750 |
| SMR Unit Specified for $H_2$ Production | — | Yes |
| Process Hydrogen Required | MM SCFD | 30.5 |
| SMR Unit Feed | — | Nat Gas |
| $CO_2$ from SMR Furnace | STPD | 862 |
| FCC Unit Specified | — | Yes |
| $CO_2$ from FCC Regenerator | STPD | 1,000 |
| Fired Heater $CO_2$ Emissions | STPD | 3,888 |
| Fired Heater Fuel, Natural Gas/Fuel Gas | vol/vol | 20/80 |
| Heat Duty for Fired Heaters | MM Btu/Hr | 2,249 |

TABLE 2

SMR Operation Results

| Item | Units | Base | SMR Capture | Invention 1 | Invention 2 | Invention 3 |
|---|---|---|---|---|---|---|
| SMR Type | — | Traditional | Traditional | Invention 1 | Invention 2 | Invention 2 |
| Carbon Capture in SMR | — | No | Yes | Yes | Yes | Yes |
| Fired Heaters | | | | | | |
| Via Fuel Gas/Nat Gas | MM Btu/Hr | 2,249 | 2,249 | 0 | 0 | 2,062 |
| Via PSA Hydrogen | MM Btu/Hr | 0 | 0 | 1,990 | 0 | 0 |
| Via Membrane Hydrogen | MM Btu/Hr | 0 | 0 | 0 | 1,971 | 150.1 |
| Via HP Steam | MM Btu/Hr | 0 | 0 | 259 | 278 | 37.0 |
| Net | MM Btu/Hr | 2,249 | 2,249 | 2,249 | 2,249 | 2,249 |
| Fuel Gas | | | | | | |
| To Fired Heaters | MM SCFD | 74.9 | 74.9 | 0 | 0 | 74.9 |
| To SMR | MM SCFD | 0 | 0 | 74.9 | 74.9 | 0 |
| Net | MM SCFD | 74.9 | 74.9 | 74.9 | 74.9 | 74.9 |
| Natural Gas | | | | | | |
| To Fired Heaters | MM SCFD | 18.7 | 18.7 | 0 | 0 | 13.4 |
| To SMR | MM SCFD | 14.6 | 13.9 | 54.7 | 54.3 | 23.1 |
| Net | MM SCFD | 33.3 | 32.6 | 54.7 | 54.3 | 36.5 |
| SMR H2 Rate | MM SCFD | | | | | |
| To Process Users | MM SCFD | 30.5 | 30.5 | 30.5 | 30.5 | 30.5 |
| To SMR Furnace | MM SCFD | 0 | 0 | 162.0 | 172.2 | 47.4 |
| To Fired Heaters | MM SCFD | 0 | 0 | 185.8 | 185.4 | 14.1 |
| Net | | 30.5 | 30.5 | 378.3 | 388.1 | 92.0 |
| Net SMR HP Steam | Lb/Hr | 85,421 | 57,488 | 85,421 | 85,241 | 85,421 |

TABLE 3

CO₂ Balance

| Item | Units | Base | SMR Capture | Invention 1 | Invention 2 | Invention 3 |
|---|---|---|---|---|---|---|
| SMR Type | — | Traditional | Traditional | | | |
| Carbon Capture in SMR | — | No | Yes | Yes | Yes | Yes |
| $CO_2$ Produced | | | | | | |
| SMR | STPD | 862 | 820 | 5,992 | 5,934 | 1,358 |
| FCC | STPD | 1,000 | 1,000 | 1,000 | 1,000 | 1,000 |
| Fired Heaters | STPD | 3,888 | 3,888 | 17 | 53 | 3,578 |
| Total | STPD | 5,750 | 5,708 | 7,009 | 6,987 | 5,936 |
| $CO_2$ Captured in SMR | STPD | 0 | 420 | 5,813 | 5,872 | 1,333 |
| $CO_2$ Emitted to Atmosphere | STPD | 5,750 | 5,288 | 1,196 | 1,115 | 4,603 |
| $CO_2$ Capture Efficiency | % | 0 | 7.4 | 82.9 | 84.0 | 22.5 |
| $CO_2$ Emission Reduction Relative to Base | % | 0 | 8.0 | 79.2 | 80.6 | 20.0 |

The invention described herein has been disclosed in terms of specific embodiments and applications. However, these details are not meant to be limiting and other embodiments, in light of this teaching, would be obvious to persons skilled in the art. Accordingly, it is to be understood that the drawings and descriptions are illustrative of the principles of the invention, and should not be construed to limit the scope thereof.

We claim:

1. A process for reducing the carbon dioxide emissions of a petroleum refinery or petrochemical plant by utilizing a low carbon hydrogen stream to fuel the process fired heaters and capturing the carbon dioxide stream pre-combustion comprising:

a) feeding a plurality of hydrocarbon feedstocks and steam to a steam reformer unit located in a petroleum refinery or petrochemical plant, said steam reformer unit comprising a reactor section and a furnace section, to create a synthetic gas stream;

b) shifting said synthetic gas stream catalytically using a water gas shift unit to create a shifted synthetic gas stream;

c) capturing the carbon dioxide from said shifted synthetic gas stream through a carbon dioxide absorption process;

d) purifying the hydrogen remaining in said shifted synthetic gas stream after step c) to create a purified hydrogen fuel stream and a purge gas stream;

e) feeding said purified hydrogen fuel stream to process fired heaters, said furnace section of said steam reformer, and/or other process users within the petroleum refinery or petrochemical plant; and f) recycling said purge gas stream from step d) to said reactor section and/or said furnace section of said steam reformer unit, and wherein the carbon emissions of the petroleum refinery or petrochemical plant are reduced by more than 20 percent.

2. The process of claim 1 wherein the carbon emissions of the petroleum refinery or petrochemical plant are reduced by more than 50 percent.

3. The process of claim 1 wherein the carbon emissions of the petroleum refinery or petrochemical plant are reduced by more than 80 percent.

4. The process of claim 1 wherein step c) utilizes an amine absorber to capture the carbon dioxide.

5. The process of claim 1 wherein step d) utilizes a pressure swing adsorber unit to purify the hydrogen.

6. The process of claim 1 wherein a majority of said purge gas from step f) is fed to said unit section of said steam reformer reactor and a smaller quantity of said purge gas from step f) is fed to said furnace section of said steam reformer unit.

7. The process of claim 5 wherein the hydrogen stream from step d) is greater than ninety-nine percent pure.

8. A process for reducing the carbon dioxide emissions of a petroleum refinery or petrochemical plant by utilizing a low carbon hydrogen stream to fuel the process fired heaters and capturing the carbon dioxide stream pre-combustion comprising:
 a) feeding a plurality of hydrocarbon feedstocks and steam to a steam reformer unit located in a petroleum refinery or petrochemical plant, said steam reformer unit comprising a reactor section and a furnace section to create a synthetic gas stream;
 b) shifting said synthetic gas stream catalytically using a water gas shift unit to create a shifted synthetic gas stream;
 c) capturing the carbon dioxide from said shifted synthetic gas stream through a carbon dioxide absorption process;
 d) feeding a portion of the hydrogen remaining in said shifted synthetic gas stream after step c) to a pressure swing adsorber to create a greater than ninety-nine percent (>99%) pure hydrogen fuel stream and a purge gas stream;
 e) purifying the remaining portion of the hydrogen remaining in said shifted synthetic gas stream not purified in step d) using a hydrogen membrane to create a lower purity hydrogen fuel stream and a membrane purge gas;
 f) feeding said greater than ninety-nine percent (>99%) pure hydrogen fuel stream from said pressure swing adsorber to process users within the petroleum refinery or petrochemical plant;
 g) feeding said lower purity hydrogen fuel stream from said hydrogen membrane to said furnace section of said steam reformer unit and to the fired heaters within the petroleum refinery or petrochemical plant;
 h) recycling said purge gas stream from step d) to said reactor section and/or said furnace section of said steam reformer unit;
 i) recycling said membrane purge gas from step e) to said reactor section of said reformer unit, and wherein the carbon emissions of the petroleum refinery or petrochemical plant are reduced by more than 20 percent.

9. The process of claim 8 wherein the carbon emissions of the petroleum refinery or petrochemical plant are reduced by more than 50 percent.

10. The process of claim 8 wherein the carbon emissions of the petroleum refinery or petrochemical plant are reduced by more than 80 percent.

11. The process of claim 8 wherein step c) utilizes an amine absorber to capture the carbon dioxide.

12. The process of claim 8 wherein a majority of said purge gas from step d) is fed to said unit section of said steam reformer reactor and a smaller quantity of said purge gas from step d) is fed to said furnace section of said steam reformer unit.

* * * * *